United States Patent [19]
Keefer

[11] 4,078,036
[45] Mar. 7, 1978

[54] CARTRIDGE FILTER CONSTRUCTION

[75] Inventor: Richard D. Keefer, Ann Arbor, Mich.

[73] Assignee: Pittsfield Products, Inc., Ann Arbor, Mich.

[21] Appl. No.: 598,672

[22] Filed: Jul. 24, 1975

[51] Int. Cl.² .......................... B29D 3/00; B29C 5/00
[52] U.S. Cl. .................................. 264/261; 264/275; 264/334
[58] Field of Search ............................. 264/261–263, 264/259, 271, 273, 275, 328, 242, 334, 318, 277, 334, 318; 249/100, 127, 150, 183; 425/DIG. 44, 124, DIG. 44, DIG. 60; 55/502; 285/DIG. 11, 19, 347

[56] References Cited
U.S. PATENT DOCUMENTS

| | | | |
|---|---|---|---|
| 2,337,550 | 12/1943 | Crosby | 264/328 |
| 2,732,031 | 1/1956 | Rabbitt et al. | 55/502 |
| 2,929,124 | 3/1960 | James | 249/100 |
| 2,965,933 | 12/1960 | Kasten | 264/275 |
| 3,247,550 | 4/1966 | Haines | 264/275 |
| 3,271,845 | 9/1966 | Breher | 264/242 |
| 3,362,141 | 1/1968 | Royster et al. | 55/502 |
| 3,395,208 | 7/1968 | Witchell | 264/263 |
| 3,640,392 | 2/1972 | Smith et al. | 55/502 |

FOREIGN PATENT DOCUMENTS

| | | | |
|---|---|---|---|
| 630,074 | 12/1961 | Italy | 55/502 |

OTHER PUBLICATIONS
Randolph, et al., Plastics Engineering Handbook, Reinhold, N. Y., (1960), pp. 198–202.

*Primary Examiner*—Willard E. Hoag
*Attorney, Agent, or Firm*—Gifford, Chandler, Sheridan & Sprinkle

[57] ABSTRACT

In a cartridge filter having a support member defining the shape of the cartridge filter and a filter media contained within the support member, a method of constructing a sealable end cap for the cartridge filter comprising the steps of placing a seal element in the forming cavity of a mold, the cavity adapted to receive one end of the support member therein, and thereafter inserting the end of the support member into the mold cavity. The mold forming cavity is then filled with a molten thermosetting epoxy material so that upon hardening, the epoxy material forms the cartridge filter end cap while simultaneously partially encapsulating the seal element, thus mechanically securing the seal element to the end cap.

5 Claims, 5 Drawing Figures

U.S. Patent            March 7, 1978            4,078,036
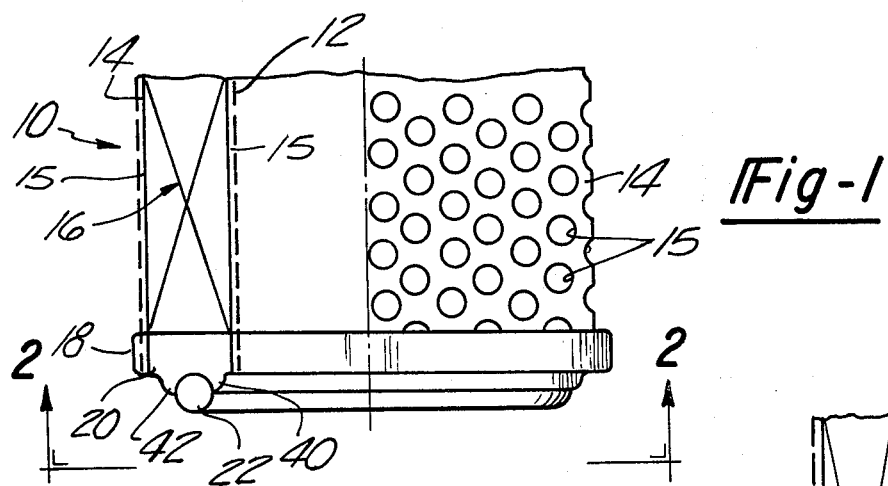
*Fig-1*
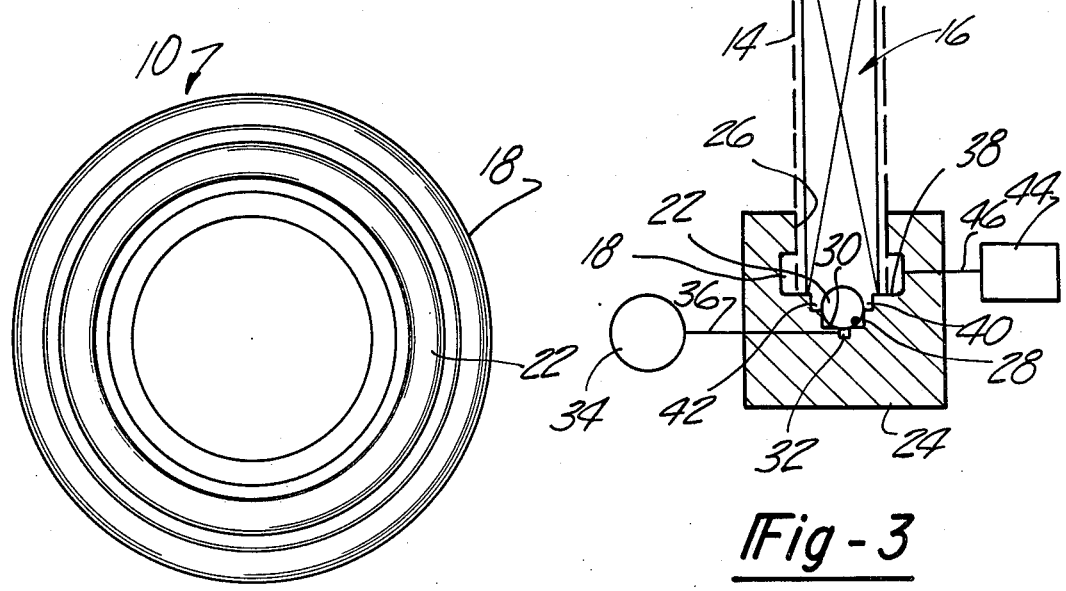
*Fig-2*
*Fig-3*
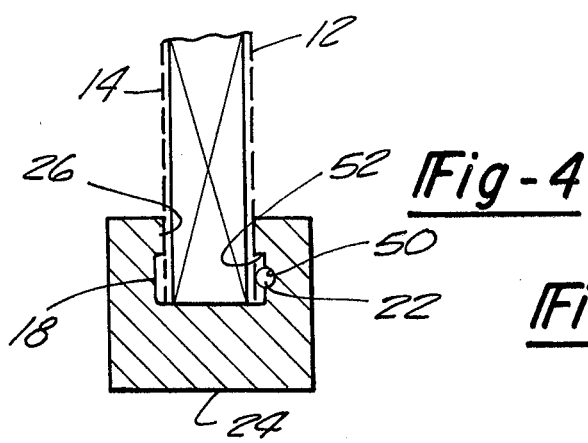
*Fig-4*
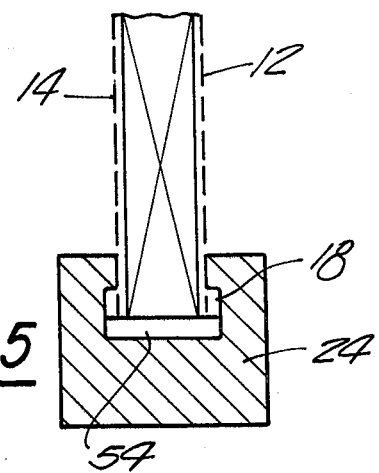
*Fig-5*

CARTRIDGE FILTER CONSTRUCTION

BACKGROUND OF THE INVENTION

I. Field of the Invention

The present invention relates generally to cartridge filter constructions, and more particularly to a sealable end cap construction for a cartridge filter.

II. Description of the Prior Art

Cartridge filters are typically cylindrical in shape and include an end cap formed around each axial end of the cartridge filter. To date, most cartridge filters are constructed with stamped sheet metal end caps held in place and sealed to the cartridge filter with various potting compounds such as plastisol, urethane or epoxy. An adhesive is then applied to the outer exposed surface of the end cap to attach a gasket to the end cap. This previously known cartridge filter end cap construction is necessarily expensive, not only in materials, but also in labor costs due to the multiple manufacturing operations required to construct the end cap.

In more recent developments the previously known sheet metal end cap is eliminated and, thereinstead, an end cap is cast or molded onto the cartridge filter. If the particular cartridge filter application does not require a high degree of chemical resistance, the end cap may be cast from such materials as plastisols or urethanes so that a gasket is formed as an integral part of the end cap due to the resilience of these materials.

However, when the filter application requires a high degree of chemical resistance, particularly at elevated temperatures, elastomeric materials, such as plastisols and urethanes, begin to break down by shrinking, cracking, dissolving, or the like. Needless to say, any of these results create an unsatisfactory seal between the cartridge filter and the cartridge filter holder. In order to provide a moldable cartridge filter end cap for applications requiring a high degree of chemical resistance, previously known end caps have been cast from a chemically resistant material such as epoxy. However, epoxy materials are generally non-resilient so that a resilient seal must thereafter be glued to the epoxy end cap in order to provide an adequate seal between the cartridge filter and the cartridge filter holder. Although this previously known cartridge filter end cap construction is less expensive than the sheet metal end cap, the epoxy-adhesive-gasket filter end cap construction is disadvantageous in that additional manufacturing operations and materials are required for its construction.

SUMMARY OF THE PRESENT INVENTION

The cartridge filter end cap construction of the present invention overcomes the above mentioned disadvantages of the previously known construction by providing an epoxy cartridge filter end cap which is simultaneously molded to the cartridge filter support member and to a seal element. In this manner, the previously known manufacturing operation of glueing the gasket to the epoxy end cap is totally obviated thus resulting in a less expensive cartridge filter end cap construction than has been previously known.

More specifically a resilient mold is provided having a forming cavity adapted to receive one axial end of the cartridge filter support member. Prior to inserting the support member end into the forming cavity, a seal element, such as an O-ring, is positioned around the base of the mold forming cavity. The mold forming cavity is then filled with a molten thermosetting epoxy material and the cartridge filter support member is then inserted into the cavity so that upon hardening, the epoxy material forms the cartridge filter end cap by bonding to the cartridge filter support member. Simultaneously, the epoxy partially encapsulates the seal element so that upon hardening, the seal element is mechanically bonded to the end cap. The resilient mold is then removed.

BRIEF DESCRIPTION OF THE DRAWINGS

The cartridge filter end cap construction of the present invention will be more clearly understood by reference to the following detailed description when read in conjunction with the accompanying drawing, wherein like reference characters refer to like parts throughout the several views, and in which:

FIG. 1 is a partial cross-sectional view showing the cartridge filter end cap construction of the present invention and with parts removed for clarity;

FIG. 2 is a bottom plan view taken substantially along line 2—2 in FIG. 1;

FIG. 3 is a partial cross-sectional view showing the filter end cap construction and mold of the present invention and with parts removed and enlarged for clarity;

FIG. 4 is a view of the cartridge filter end cap construction similar to FIG. 3 but showing a modification thereof; and FIG. 5 is a view of the cartridge filter end cap construction of the present invention similar to FIGS. 3 and 4 but showing still a further modification thereof.

DETAILED DESCRIPTION OF THE PRESENT INVENTION

Referring first to FIGS. 1 and 2, a portion of a cartridge filter 10 is shown having an inner macro-porous support member 12 and an outer macro-porous support member 14 containing a filter media, illustrated diagrammatically at 16, therebetween. The support members 12 and 14 are shown in FIG. 1. as constructed of perforated metal having apertures 15 but any other conventionally used materials, for example expanded metal, wire cloth, extruded plastic, injection molded plastic, and the like, may be utilized without deviating from the spirit or scope of the invention.

In a manner to be shortly described in detail, and end cap 18, constructed of chemically resistant epoxy material, is secured to one axial end 20 of the support member 12 and 14. It is to be understood that in most constructions the filter 10 will have an end cap similar to the cap 18 at the opposite end thereof. Only the end cap 18 will be described but it should be understood that it is contemplated that the method of the present invention will be used to make the other end cap as well.

The end cap 18 is generally annular in shape and carries with it a seal element 22, such as an O-ring. The seal element 22 is adapted to abut against a cartridge filter holder (not shown) to provide a sealing engagement between the filter holder and the filter end cap 18 in the conventional fashion.

The method of construction for the cartridge filter end cap 18 of the present invention is best understood by reference to FIGS. 1 and 3. FIG. 3 shows a mold 24 constructed of an elastomeric material, such as rubber, having an annular forming cavity 26 adapted to receive the support members 12 and 14 therein. The seal element 22 is positioned partly within a small annular groove 28 formed along and around the base of the cavity 26. In order to insure proper seating of the seal element 22 along the annular groove 28, a yet smaller vacuum groove 32 is formed along the base of the annular groove 28 and communicates with a source of vacuum 34 by way of a conduit 36. The source of vacuum 34 thus serves not only to retain the seal element 22 in the groove 28 but in addition functions to compensate for any irregularities of the seal element 22.

With the seal element 22 properly seated in the annular groove 28, a molten thermosetting epoxy material is poured into the cavity 26 and the filter support elements 12 and 14 are then inserted into the mold cavity 26 until the support members 12 and 14 abut against an annular abutment surface 38 formed in the cavity 26. The epoxy fills the support member apertures 15, so that as the molten epoxy hardens, the epoxy material bonds to the support members 12 and 14 while forming the filter end cap 18 of the present invention. Simultaneously, the epoxy material fills and hardens in annular ridge portions 40 and 42 formed in the cavity 26 adjacent to the annular groove 28. The ridge portions 40 and 42 partially encapsulate the seal member 22 so that the seal member 22 is mechanically secured to the end cap 18 by the ridge portions 40 and 42. The resilient mold 24 is then removed from the completed end cap 18. Thus it can be seen that the seal member 22 is secured to the cartridge filter 10 simultaneously with the molding of the end cap 18 without the necessity of glueing the seal element 22 to the end cap 18.

The actual method of filling the cavity 26 with an epoxy material, however, has not been found to be critical. For example as shown in FIG. 3 a means 44 to inject molten epoxy is shown communicating with the cavity 26 by a conduit 46 formed through the mold 24. In this modification of the present invention the seal element 22 is positioned within the annular groove 28 and the support members 12 and 14 are inserted into the cavity 26 thereby forming the end cap 18 in the previously described manner.

A modification to the end cap shown in FIG. 3 is illustrated in FIG. 4 wherein an annular groove 50 formed circumferentially around the inner side wall 52 of the cavity 26 replaces the annular groove 28 shown in FIG. 3. As in the preferred embodiment, the seal element 22 is positioned around the groove 50 and the epoxy forms the end cap 18 while simultaneously partially encapsulating the seal element 22 to the end cap 18. However, unlike the preferred form of the invention, the seal element 22 may be slightly undersized for the mold cavity 26 so that the natural resilience of the seal element 22 will retain the seal element 22 in the groove 50 without the necessity of the vacuum groove and the associated source of vacuum pressure.

Still another modification of the present invention is illustrated in FIG. 5 in which the seal element 22 comprises a relatively flat annular gasket 54. As before, the molten epoxy forms the end cap 18 while simultaneously bonding the gasket 54 to the end cap 18. However, unlike the preferred and first modification of the present invention, the gasket 54 may be secured to the end cap 18 by the natural adhesion between the epoxy and the gasket 54. Alternatively, of course, the gasket 54 may be partially encapsulated by the epoxy end cap 18 to secure the gasket 54 to the end cap 18.

It can thus be seen that the present invention provides a novel means of constructing an end cap 18 for a cartridge type filter 10. As has been described in detail, as the molten epoxy hardens and forms the cartridge filter end cap, the epoxy simultaneously bonds to both the support members of the cartridge filter and mechanically encapsulates and secures a seal element to the end cap. Thus the present invention eliminates the previously known requirement of glueing the seal element to the end cap.

Having thus described my invention many modifications thereto will become apparent to those skilled in the art to which it pertains without deviating from the spirit of the invention as defined by the scope of the appended claims.

What is claimed is:

1. A method for constructing a sealable end cap on a cartridge filter of the type having a support member defining the shape of the cartridge filter and having filter media contained by the support member, said method comprising the steps of: placing an elastomeric seal ring in a first annular groove in a wall defining a mold cavity in a flexible elastomeric mold having an open top, said cavity being adapted to receive a filter support portion, said mold also having a smaller second annular groove in the bottom of said first annular groove communicating with vacuum means; evacuating said second annular groove to retain said seal ring in place in said first groove; inserting said support member portion into said cavity through said open top; filling said mold cavity with molten thermosetting epoxy material so that said epoxy material sealingly engages said support member and encapsulates a portion of the outer periphery of said seal ring extending outside of said first groove; and removing said mold after said epoxy material has hardened.

2. The invention as defined in claim 1 wherein said mold is constructed of an elastomeric material and said last mentioned step comprises bending the mold away from said epoxy materials and removing said cartridge filter through said opening.

3. The invention as defined in claim 1 and in which the penultimate step comprises injecting said epoxy into said mold cavity.

4. The invention as defined in claim 1 wherein said seal ring is constructed of a chemically resistant elastomeric material.

5. The invention as defined in claim 4 wherein said seal ring is an O-ring.

* * * * *